Feb. 2, 1926.

P. COMPTON 1,571,757

BRAKE BAND LINER

Filed Sept. 10, 1923

Pearl Compton, Inventor

By Lancaster and Allwine, Attorneys

Patented Feb. 2, 1926.

1,571,757

UNITED STATES PATENT OFFICE.

PEARL COMPTON, OF FLINT, MICHIGAN.

BRAKE-BAND LINER.

Application filed September 10, 1923. Serial No. 661,921.

*To all whom it may concern:*

Be it known that I, PEARL COMPTON, a citizen of the United States, residing at Flint, in the county of Genesee and State of Michigan, have invented certain new and useful Improvements in Brake-Band Liners, of which the following is a specification.

This invention relates to brakes for motor vehicles and the like, and more particularly to liners for brake bands adapted to prevent vibration or chattering when contracted upon the band and adapted to provide a firm grip by a relatively slight pressure on the operating lever or pedal.

Another object of the invention is to provide a cushion support or backing for a brake lining adapted to hold the lining from creeping and for exerting a variable pressure at a plurality of spaced contact points when the brake band is contracted, the points increasing in width proportionate to the increase in the applied pressure.

A further object of the invention is to provide a brake lining and support of this character which may be applied to the brake and transmission bands of a Ford automobile, or which may be applied to wheel drum brakes or wherever a firm and gradual gripping action is required.

The above and various objects and advantages of this invention will in part be described in and in part be understood from the following detailed description of the present preferred embodiment, the same being illustrated in the accompanying drawing, wherein.

Figure 1:
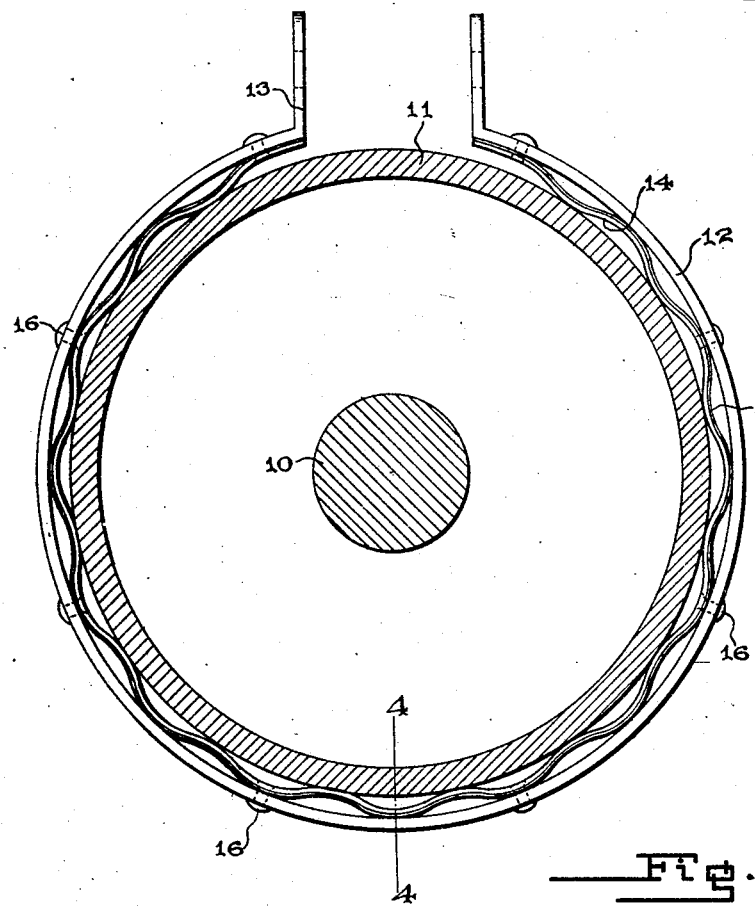
Fig. 1 is an edge view of a brake brand having a liner constructed according to the present invention applied thereto, a drum and shaft being shown in section.
Figure 2:
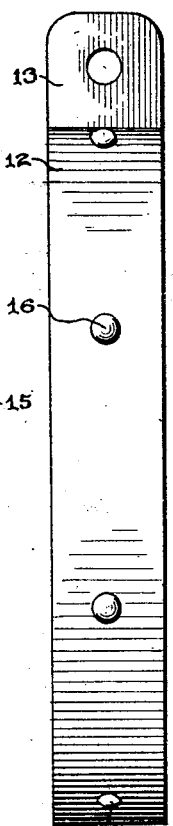
Fig. 2 is a side elevation of the brake band.
Figure 4:
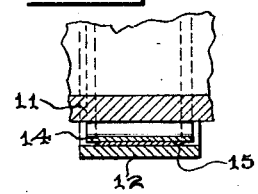
Fig. 4 is a fragmentary transverse section through the liner in position, taken substantially on the line 4—4 of Fig. 1.
Figure 3:
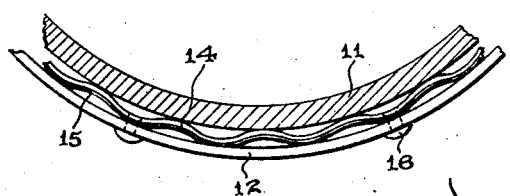
Fig. 3 is a fragmentary sectional view through a portion of the liner under compression.

Referring to the drawing, 10 designates a shaft on which is mounted a drum 11, the illustration being merely diagrammatic of a drum or other member adapted to receive a contracting member thereon.

Spaced about the drum 11 is a contracting band 12 of any suitable type, such as is found in the transmissions of Ford automobiles. The band 12 is provided with apertured ears 13 on opposite ends which are bent outwardly in parallel relation to each other. These ears are adapted to be moved toward and from each other for contracting and expanding the band 12 in the acts of braking and releasing the drum 11.

The liner 14 comprises a flat strip of suitable width and length to cover the inner surface of the band 12 and grip the drum 11. This band 14 or liner may be of any suitable material, such as some of the asbestos composition materials used at the present day, and this strip or layer 14 is yieldingly supported within the band 12 by a crimped spring 15. The crimped spring 15 is tortuous throughout its entire length to provide a succession of alternate raised and depressed portions for initially binding the friction strip 14 at spaced points upon the drum 12. This spring 15 is connected to the inner side of the contracting band 1 by a plurality of rivets 16 which engage through the band 12, spring 15 and the liner band 14. The rivets 16 are spaced along the band 12 and spring 15 a suitable distance to provide several crimps or corrugations of the spring between the rivets 16. Such construction provides a variable cushion between the rivets which automatically sets and equalizes the pressure of the high points of the spring throughout the distance between the rivets. The rivets also prevents the creeping of the spring and liner and localize each adjustment between its respective rivets.

The spring 15 serves as a support for the friction strip 14 and serves to gradually increase the friction gripping surface as the contracting band 12 is closed about the drum.

In operation, when the band 12 is contracted upon the drum 11, the spring 15 brings the friction lining 14 into contact with the drum 11 at spaced points, and such points or places of contact are relatively narrow while the pressure is light so as not to grip the drum abruptly. Continuing the contraction of the band 12, the spring 15 is urged into more intimate contact with the drum 11 and the said points of contact are broadened and enlarged so as to increase the surface area of contact between the lining and the drum. This further contraction of the band 12 also deforms the crimped spring 15 and tends to flatten the same out. Owing however to the arrangement of the rivets 16 the spring 15 is not free at its end and therefore can not be flattened. The result is that the higher points of contact of the spring are depressed proportionately to a greater extent relative to the adjacent points of contact and there results a relative shifting and equalizing of the contact points of the spring so that a uniform pressure of the spring entirely about the drum 11 is produced.

As the spring provides spaced points of contact which are resilient, any tendency of vibration or chattering is absorbed in the arched portions of the spring and a firm gripping is the result when continued pressure is exerted upon the band 12.

It is of course understood that various changes and modifications may be made in the details of construction and design of the above specifically described embodiment of the invention without departing from the spirit thereof, such changes and modifications being restricted only by the scope of the following claims.

What is claimed is:

1. A brake band liner comprising an inner friction strip, and a supporting backing strip, said backing strip comprising a transversely corrugated spring secured to the friction strip for binding the same at spaced points about a drum.

2. A brake band liner comprising an inner friction strip, a contracting member, and a transversely corrugated spring interposed between the friction strip and the contracting member and adapted to support the friction strip for contact with a drum at spaced points thereabout, and anchoring means securing the spring at spaced points throughout its length to said contracting member.

PEARL COMPTON.